United States Patent
Nelson

(10) Patent No.: US 7,174,710 B1
(45) Date of Patent: Feb. 13, 2007

(54) NELSON FLYWHEEL POWER PLANT IMPROVEMENT

(76) Inventor: Rodney Nelson, 452 Toler Rd., Princeton, NC (US) 27569

( * ) Notice: Subject to any disclaimer, the term of this patent is extended or adjusted under 35 U.S.C. 154(b) by 0 days.

(21) Appl. No.: 11/164,014

(22) Filed: Nov. 7, 2005

(51) Int. Cl.
*F01D 1/32* (2006.01)
*F01D 15/00* (2006.01)
*F03B 17/02* (2006.01)

(52) U.S. Cl. .......................... 60/421; 92/54
(58) Field of Classification Search ............ 60/325, 60/374, 421, 729; 91/177; 92/54; 418/161, 418/177
See application file for complete search history.

(56) References Cited

U.S. PATENT DOCUMENTS 3,990,228 A * 11/1976 Bailey et al. ............... 60/772
4,466,245 A * 8/1984 Arold .......................... 60/415

* cited by examiner

*Primary Examiner*—Thomas E. Lazo
(74) *Attorney, Agent, or Firm*—Louis Ventre, Jr.

(57) ABSTRACT

An improvement to the Nelson Flywheel Power Plant comprising a piston (100 and 101) in each outer chamber (40 and 41) situated at the interface of the compressible fluid and incompressible fluid (120) and slidably adjoining the center shaft (14) and rotatable housing (10). A method of using the improvement comprising the steps of introducing a compressed fluid along a path (110) that acts on one of the pistons (100) to move the incompressible fluid along a path (120); then moving the spool (15) to permit return of the incompressible fluid; and then introducing a compressed fluid to act on the other piston (101) to return the incompressible fluid.

14 Claims, 3 Drawing Sheets

NELSON FLYWHEEL POWER PLANT IMPROVEMENT

FIELD OF INVENTION

In the field of power plants, a piston for improving the Nelson Flywheel Power Plant for converting heat and potential energy to kinetic energy very efficiently and with a potential for significantly less pollution than state of the art heat engines.

DESCRIPTION OF PRIOR ART

The Nelson Flywheel Power Plant is the subject of a pending U.S. patent application Ser. No. 10/906,685, which is incorporated by reference as if fully set forth herein, and which was filed on Mar. 2, 2005 by the same inventor as the present invention.

The Nelson Flywheel Power Plant converts pressure and heat energy in a pressurized gas to kinetic energy of a rotating flywheel by employing a recycling incompressible motive fluid. The power plant uses a single-phase motive fluid, that is, the motive fluid remains primarily in liquid state and is distinguished from two-phase (gas/liquid) engines. The products of combustion together with a recyclable liquid motive fluid may be used. Energy is stored in the flywheel and extracted as needed. An operational cell of the power plant has 4 internal chambers aligned linearly along a stationary central shaft and a power plant may have any number of operational cells.

Continuing research, development and testing on the Nelson Flywheel Power Plant has shown a potential to improve the device disclosed in the above referenced patent application by the addition of a piston in the two outer chambers of each operational cell. Minor configuration changes in the power plant are also made to accommodate this improvement.

This improvement invention advances the state of the art of the heat engines, particularly internal combustion engines, by better enabling fuel consumption with high percentages of oxygen, or with pure oxygen, while maintaining a broad range of operating temperatures and pressures. For example, using compressible fluids having a chlorofluorocarbon component could achieve a low-end operating temperature of about 100 degrees Fahrenheit. Other compressible fluids might offer even lower temperatures. At the high end, the temperature is limited only by the practical ability of the materials exposed to those temperatures to survive. With ceramics and other high temperature materials, today's practical limit is about 5,000 degrees Fahrenheit.

It is well known that fuels will burn more thoroughly and vigorously in oxygen than in air and at a much higher temperature. Air has an oxygen concentration of about 21 percent at standard temperature and pressure. The automotive racing industry uses nitrous oxide as an oxygen enhancer to temporarily boost power output from an internal combustion engine. In those applications, nitrous oxide breaks down to nitrogen and oxygen at the engine combustion temperature and increases oxygen concentration up to almost 50 percent. However, such use of higher oxygen concentration is highly destructive to traditional internal combustion engine components because of increased pressures and temperatures. It will quickly burn out an internal combustion engine if employed to produce more than a brief pulse of extra power.

The present invention eliminates the compression cycle of a traditional internal combustion engine and the limitations attendant to using high oxygen concentrations in a continuous process. No known prior art heat engine, other than rockets, is capable of continuously operating with pure oxygen or even a modestly enriched mix.

The ability of the Nelson Flywheel Power Plant to continuously operate with pure oxygen advances the state of the art and offers the potential to apply the power plant in the renewable energy field. For example, conventional engines require highly processed fuels. These engines require modification to utilize renewable fuels. However, oxygen readily combines with organic matter in its many compositions (e.g., plastics and other municipal wastes), much of which winds up in landfills at great expense, or rots away in farm fields and woodlands. As a stationary installation, the Nelson Flywheel Power Plant can utilize much of this waste material as a fuel to provide heat and electricity. It is expected to provide a much lower cost of power while also lowering environmental emissions, reducing costs of waste disposal, and slowing the growth of landfills. In addition, more thorough burning attendant to using high concentrations of oxygen is aptly suited to the destruction of hazardous and toxic wastes. Using such fuels with the Nelson Flywheel Power Plant enables the production of useful power in connection with the destruction of hazardous and toxic wastes.

Unlike the state of the art, the Nelson Flywheel Power Plant does not use a compression stroke in a fixed volume. Rather, when internal combustion is utilized, the compressible fluid is heated while volume is expanding and this maintains a relatively constant temperature and pressure throughout the power cycle. When external combustion is employed, the expanding volume for the compressible fluid permits utilizing rising temperature in the compressible fluid to maintain a constant pressure.

It is, therefore, an object of this invention to improve performance and efficiency in the operation of the Nelson Flywheel Power Plant with the incorporation of a piston in the two outer chambers of each operational cell.

Accordingly, the present invention will add to the potential for the Nelson Flywheel Power Plant to substantially reduce energy consumption for a given power output while producing significantly less pollution than currently available heat engines.

BRIEF SUMMARY OF THE INVENTION

A device and method of using the device is disclosed. The device is a piston situated at the interface of the compressible fluid and incompressible fluid in each outer chamber of each operational cell within the Nelson Flywheel Power Plant. The method of using the piston comprises the steps of introducing a compressed fluid that acts on one of the pistons to move the incompressible fluid; moving the spool to permit return of the incompressible fluid; and introducing a compressed fluid to act on the other piston in an operational cell to return the incompressible fluid.

DETAILED DESCRIPTION OF THE INVENTION

The drawings depict a specific embodiment of the invention, which is an improvement to the Nelson Flywheel Power Plant. The drawings and the description herein describe such parts of the power plant as necessarily cooperate with the improvement or as may be necessary to a complete understanding or description of it. Thus, the figures do not show all components or details of an operational cell of the power plant as shown in the original application referenced above. Some components or details were omitted for clarity. Intentional omissions of components in support of the present invention are described herein. When shown, components are numbered consistently with the original application for the Nelson Flywheel Power Plant.

Figure 1:
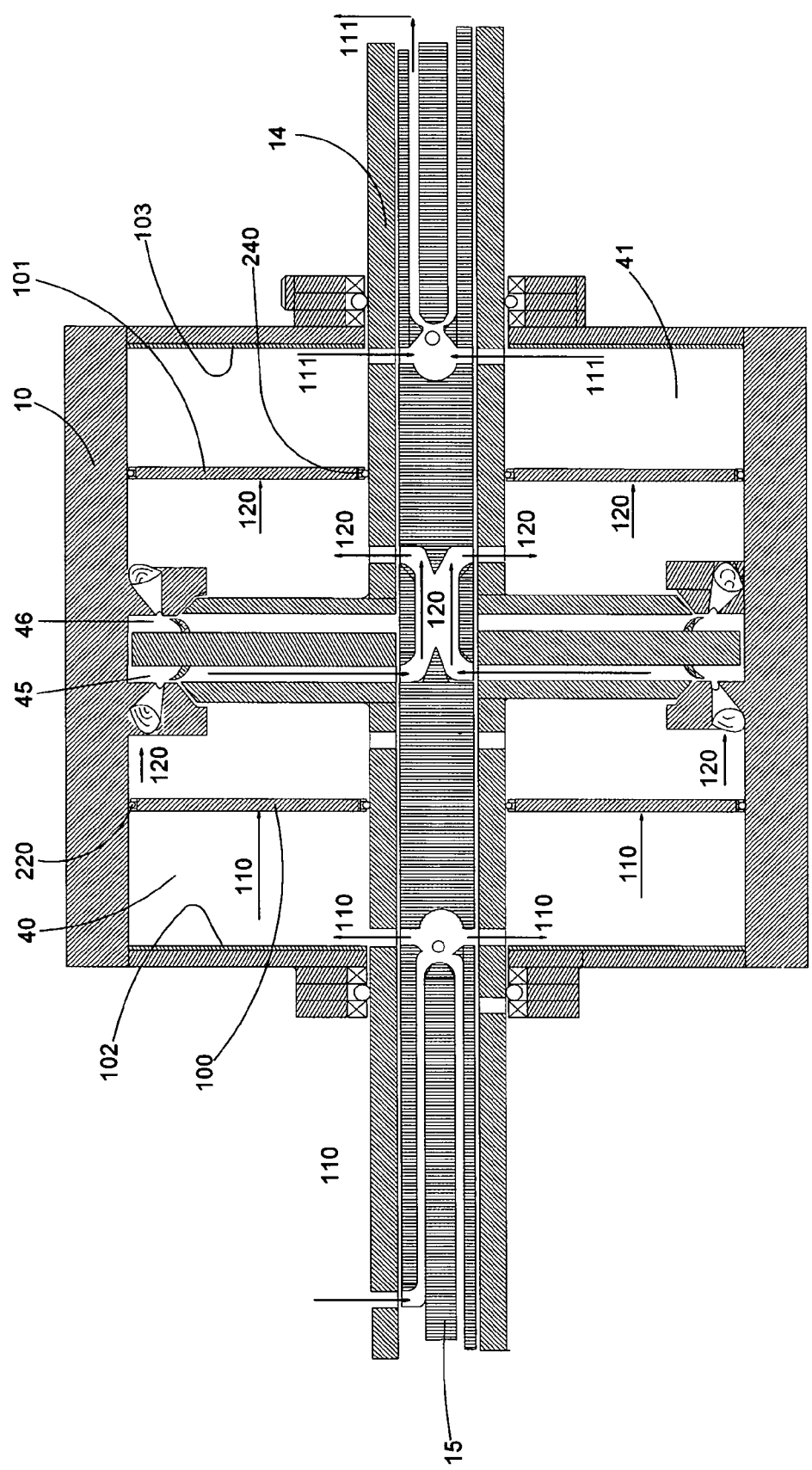
FIG. 1 is a lengthwise cross-sectional view of an embodiment of an operational cell in a Nelson Flywheel Power Plant.

FIG. 1 is a lengthwise cross-sectional view of an embodiment of one operational cell in a Nelson Flywheel Power Plant, showing the pistons (100 and 101) of the invention and the relevant power plant internals. The operational cell is essentially a rotating cylindrical structure divided into four chambers (40, 45, 46 and 41). The pistons (100 and 101) are essentially circular plates slidably mounted on a center non-rotatable shaft (14) and extending to the rotatable housing (10) serving as a flywheel.

In operation, the pistons (100 and 101) are situated at the interface of the compressible fluid and incompressible fluid in each outer chamber (40 and 41) of each operational cell within the Nelson Flywheel Power Plant. Thus, the pistons (100 and 101) more or less separate the compressible fluid from the incompressible fluid in the outer chambers (40 and 41)

Figure 2:
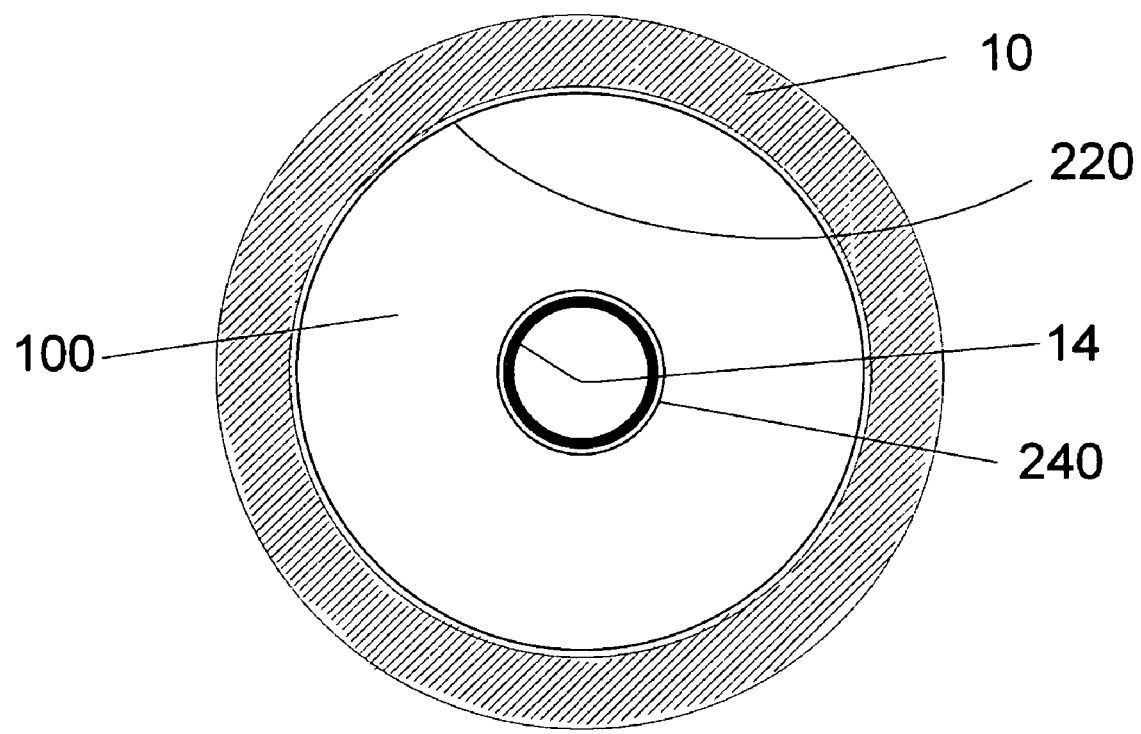
FIG. 2 is a widthwise cross-sectional view of an embodiment of an operational cell at a piston location.

FIG. 2 is a widthwise cross-sectional view of an embodiment of an operational cell at a piston (100) located in a first outer chamber (40).

Figure 3:
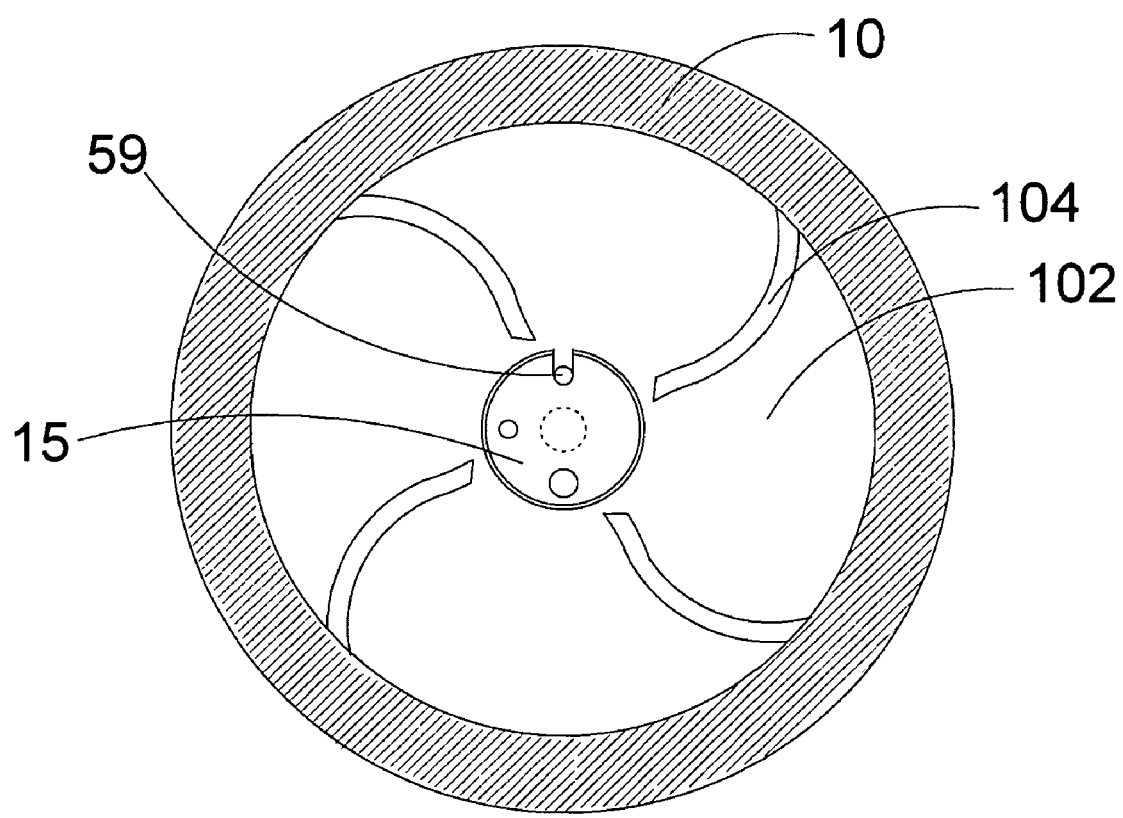
FIG. 3 is a widthwise cross-sectional view of an embodiment of an operational cell at a housing end wall.

FIG. 3 is a widthwise cross-sectional view of an embodiment of an operational cell at a housing sidewall (102) showing the vanes (104) that remove incompressible fluid from the compressible-fluid side of the piston. The vanes (104) are on both internal sidewalls (102 and 103) of the housing (10).

The Nelson Flywheel Power Plant employs an incompressible fluid and a compressible fluid. In most embodiments, the incompressible fluid is recycled and the compressible fluid is exhausted or discharged from the outer chambers.

The Nelson Flywheel Power Plant has a non-rotating shaft (14) with radial projections forming four chambers within a housing (10), to wit, a first outer chamber (40), its adjacent inner chamber (45), a second outer chamber (41) and its adjacent inner chamber (46). The housing (10) is rotatably sealed and mounted on the shaft (14). The power plant has a ported spool (15) with flow channels (70) fitting within the shaft (14). It has a means for imparting rotational energy (e.g. vanes or nozzles) to the housing (10). It has a means for pressurizing a compressible fluid in each outer chamber, e.g. internal or external combustion.

In operation, a compressed fluid, which has a flow path (110), is introduced into the first outer chamber (40). The compressed fluid pushes an incompressible fluid into an adjacent inner chamber (45) through the means for imparting rotational energy, e.g. the nozzles. The incompressible fluid then flows to a second outer chamber (41) through the spool (15). Then, the flow is reversed by relocating the spool (15) so that the incompressible fluid can flow from the second outer chamber (41) through the nozzles to the adjacent inner chamber (46), then to the first outer chamber (40) via the spool (15). An operational cell has these four chambers. Additional operational cells can be added along the shaft to add to the power output of the power plant. The Nelson Flywheel Power Plant is more fully described in the above noted patent application for the Nelson Flywheel Power Plant.

The improvement to the Nelson Flywheel Power Plant is characterized by the addition of a piston (100 and 101) in each outer chamber (40 and 41) of an operational cell at the interface of the compressible and incompressible fluids in operation of the power plant. In the preferred embodiment, the pistons (100 and 101) slidably adjoin the non-rotating shaft (14) and rotatable housing (10). In an alternate embodiment, the pistons are not in contact with the housing (10) and slidably adjoin the shaft (14). In the preferred embodiment, each piston is a circular, flat-plate concentrically positioned on the center shaft, as shown in FIG. 2.

FIG. 2 is a widthwise cross-sectional view of an embodiment of an operational cell at the piston (100) location in a first outer chamber (40). FIG. 2 shows a central immovable shaft (14), a rotatable housing (10), a slidable seal (220) at the edge of each piston (100 and 101) adjoining the housing (10) and a slidable seal (240) at the edge of each piston adjoining the shaft (14). Slidable seals, for example rings, are well known in the art.

The improvement to the power plant cycle can be described by reference to FIG. 1 where arrows (110 and 111) represent the path of compressible fluids in an embodiment that supplies the compressible fluid from a source external to the outer chamber (40). Compressible fluid in this embodiment is also supplied from a source external to the other outer chamber (41), but this is not shown in FIG. 1 for clarity. The path of incompressible fluids is shown in FIG. 1 acting from left to right. However, it should be appreciated that this path can be similarly described from right to left, even though this path is not depicted in FIG. 1.

The piston (100) in the first outer chamber (40) and the piston (101) in the second outer chamber (41) are located at the interface of the compressible and incompressible fluids (not shown) in those chambers.

In operation, a compressed fluid, which has a flow path (110), is introduced into the first outer chamber (40). The compressed fluid pushes the piston (100) in the first outer chamber (40) such that an incompressible fluid on the other side of the piston (100), which has a flow path (120), flows into an adjacent inner chamber (45) through the means for imparting rotational energy (e.g. nozzles). The incompressible fluid then flows to a second outer chamber (41) through the spool (15). Then, the incompressible fluid is returned to the first outer chamber (40) through a mirror image path.

To accomplish return of the incompressible fluid from the second outer chamber (41) to the first outer chamber (40), the spool (15) is first relocated so that the incompressible fluid can flow from the second outer chamber (41) through the means for imparting rotational energy (e.g. nozzles) to the adjacent inner chamber (46) and so that compressed fluid can be introduced into the second outer chamber (41) to push against the piston (101) in that chamber.

Thus, in the preferred embodiment, the piston (100) in the first outer chamber (40) slides axially to the right while adjoining the center shaft (14) and the inside surface of the rotatable housing (10). The piston (100) is slidably driven by the compressed fluid acting across the piston's left side surface area. On the right side of that piston, the incompressible fluid is driven through nozzles or other means for turning the housing, flowing into an adjacent inner chamber (45) and thence to the second outer chamber (41) where the other piston (101) slides to the right pushing out compressible fluid (111) in that chamber (41). The spool then relocates and incompressible fluid is then returned to the first outer chamber through a similar mirror-image path.

This process is repeated as long as desired. While the compressible fluids are discharged in a cycle, it should be appreciated that the incompressible fluid is not discharged but used over and over again in a reciprocating cycle.

An embodiment of the invention incorporates a means for removing incompressible fluid from the compressible-fluid side of the pistons. This means for removing is curved vanes (104) shown in FIG. 3 on the housing sidewalls (102 and 103) plus the elimination of two stationary projections from the shaft (14) at those sidewalls, which were optionally part of the original patent application for each operational unit of the Nelson Flywheel Power Plant.

The rotating outer sidewalls (102 and 103) of the housing (10) have curved vanes (104), to channel unwanted incompressible fluid from the periphery of the housing (10) to an exhaust port and thence out of the volume of the outer chamber used for the compressible fluid.

The two aforementioned stationary projections from the central shaft (14), which had previously formed outer sidewalls in the outer chambers as shown in FIG. 1 of the original application, have been removed in this embodiment. These stationary sidewalls were redundant outer walls and are non-essential. Their original function was to shield and reduce heat and pressure to seals and bearings of the rotating housing (10). In the preferred embodiment of this improvement, the rotating outer sidewalls (102 and 103) of the housing (10) serve to define the outer sidewalls of the two outer chambers (40 and 41).

In the operation of this embodiment of the invention, any incompressible fluid on the compressible-gas side of the pistons (100 and 101) flows to the periphery of the rotating housing (10) by the centrifugal effect. That incompressible fluid then flows by natural forces to the rotating sidewalls (102 and 103) of the housing (10). At the sidewalls, the incompressible fluid is continuously conveyed by the curved vanes (104) on the housing sidewalls (102 and 103) towards the exhaust ports in the shaft (14) and is removed with the compressible fluid. In this embodiment, the exhaust ports are opened or closed automatically by cycling the spool (15) in the normal operation of the power plant.

An alternative embodiment of the invention includes a means for adding compressible fluid to the incompressible-fluid side of the pistons to make up for lost incompressible fluid. This means for adding are separate tubes or flow channels (70) within the spool. The invention contemplates the ability to add separate flow channels within the spool as required to respond to desired fluid conveyances to and from the chambers within the housing (10). Such fluid conveyances are controlled at the discretion of the designer. For example, make-up compressible fluid flows are initiated by controlling the position of one or more valves (59) located at the end of the non-rotating fixed shaft (14).

The addition of a piston (100 and 101) in each outer chamber (40 and 41) serves three significant purposes and improves overall power plant operational efficiency and environmental performance: it minimizes extreme temperatures coming in direct contact with the incompressible fluid covered by the piston, which can lead to loss of the incompressible fluid by vaporization; it delivers a means to uniformly apply pressure to the incompressible fluid, which improves the flow that turns the housing (10); and it maximizes the hydraulic pressure differential through the nozzles, blades or other means that turn the housing (10), since it assures that the piston surface area acts on the incompressible fluid.

The use of a piston (100 and 101) in each outer chamber of an operational cell enhances the versatility of the power plant to operate with a potential temperature and pressure range limited only by the materials used and the desired power output. For example, calculations indicate that practical alternative embodiments of the power plant could operate using compressible fluids containing chlorofluorocarbons at about 100 pounds per square inch and with an operating temperature range of about 250–400 degrees Fahrenheit. As another example, a practical operating temperature range using known materials is between about 100 to 5,000 degrees Fahrenheit. Aside from strength of materials limitations, the required operating pressure of the compressible fluid is largely dependent on the surface area of the piston and the power output desired.

A practical effect of a large temperature and pressure range operating capability is the ability to use high concentrations of oxygen as a fuel oxidizer. Because oxygen will react with nearly all organic materials, using oxygen as an oxidizer expands the potential fuels that may be used to provide the compressed fluid in the power plant. Thus, an embodiment of the process of using the present invention employs high concentrations of oxygen to provide the compressed fluid to continuously burn and fully consume organic matter fuel, such as municipal waste, peat, farm waste, etc. In alternative embodiments, the higher the oxygen concentration used, the better in terms of fuel efficiency and environmental performance of the power plant. Using relatively pure oxygen provides the highest fuel consumption efficiency, lowest environmental pollution emissions, and lowest cost of power. Ancillary benefits of this process include renewable fuel consumption and reduction in organic waste disposal costs.

The center shaft (14) does not rotate during operation of the Nelson Flywheel Power Plant. Thus, the pistons (100 and 101) need not rotate to perform their function. However, rotational forces act on the pistons because each piston may adjoin the rotating housing (10) and, thus, be influenced by the rotation of the housing. Further, each piston is in contact with incompressible fluids, which rotate during operation of the power plant. Thus, for alternative embodiments, a slidable bearing is used to connect the piston to the center shaft (14) to allow the piston to freely rotate in response to the rotational forces, thereby reducing friction and torsional forces.

Similarly, in an alternative embodiment, a slidable bearing connects each piston to the housing (10), reducing the frictional resistance of each piston to the rotating housing (10).

The description above and the examples noted are not intended to be the only embodiments of this invention and should not be construed as limiting the scope of the invention. These examples merely provide illustrations of some of the embodiments of this invention. Others will be obvious to those skilled in the art. Thus, the scope of the invention is determined by the appended claims and their legal equivalents rather than by the examples given.

What is claimed is:

1. An improvement to a power plant employing an incompressible fluid and a compressible fluid and having non-rotating shaft with radial projections forming four linearly aligned chambers per operational unit, a housing rotatably sealed and mounted on said shaft enclosing said chambers, a ported spool with flow channels fitting within said shaft, a means for imparting rotational energy to said housing by fluid flow from a first outer chamber through an adjacent inner chamber to a second outer chamber and back through a similar path; and a means for pressurizing a compressible fluid in each outer chamber, said power plant also known as a Nelson Flywheel Power Plant, wherein the improvement comprises a piston in each outer chamber of each operational cell, wherein said piston is situated at the interface of compressible and incompressible fluids therein, and wherein said piston slidably adjoins the shaft.

2. The improvement of claim 1 further comprising a slidable seal at the edge of each piston adjoining the shaft.

3. The improvement of claim 1 wherein each piston slidably adjoins the housing.

4. The improvement of claim 3 further comprising a slidable seal at the edge of each piston adjoining the housing.

5. The improvement of claim 1 wherein each piston is a circular, flat-plate concentrically positioned on the shaft.

6. The improvement of claim 1 further comprising a slidable bearing connecting each piston to the shaft.

7. The improvement of claim 1 further comprising a slidable bearing connecting each piston to the housing.

8. The improvement of claim 1 further comprising a means for removing incompressible fluid from the compressible-fluid side of the pistons.

9. The improvement of claim 1 further comprising a means for adding incompressible fluid to the incompressible-fluid side of the pistons.

10. A process of using the improvement of claim 1 comprising the steps of:

(a) introducing a compressed fluid into the first outer chamber wherein said compressed fluid pushes the piston in said first outer chamber such that the incompressible fluid flows into an adjacent inner chamber through the means for imparting rotational energy and then through the spool and into the second outer chamber;

(b) moving the spool to create a flow path from the second outer chamber through an adjacent inner chamber to the first outer chamber;

(c) introducing a compressed fluid into the second outer chamber wherein said compressed fluid pushes the piston in said second outer chamber such that the incompressible fluid flows into the adjacent inner chamber through the means for imparting rotational energy and then through the spool and into the first outer chamber; and, (d) repeating steps (a) through (c) to continue the process.

11. The process of claim 10 wherein the compressed fluid is within a temperature range of about 100 to 5,000 degrees Fahrenheit.

12. The process of claim 10 wherein the compressed fluid is within a temperature range of about 250 to 400 degrees Fahrenheit and at a pressure of about 100 pounds per square inch.

13. The process of claim 10 wherein the compressed fluid is continuously created by combustion of fuel with oxygen having a concentration greater than that in air at standard temperature and pressure.

14. The process of claim 13 wherein the oxygen concentration is about 100 percentum.

* * * * *